United States Patent [19]
Pressaco et al.

[11] Patent Number: 5,451,098
[45] Date of Patent: Sep. 19, 1995

[54] MULTISLOPE COMPENSATOR

[75] Inventors: Pierre Pressaco, La Courneuve; Roland Levrat, Stains, both of France

[73] Assignee: AlliedSignal Europe Services Techniques, Drancy, France

[21] Appl. No.: 397,312

[22] Filed: Mar. 2, 1995

Related U.S. Application Data

[63] Continuation of Ser. No. 50,242, filed as PCT/FR 93/00292, Mar. 24, 1993

[30] Foreign Application Priority Data

Apr. 30, 1992 [FR] France .................. 92 05324

[51] Int. Cl.⁶ .............................................. B60T 8/18
[52] U.S. Cl. ............................ 303/9.69; 188/195; 188/349; 303/9.72; 303/9.75; 303/22.8
[58] Field of Search ............... 303/9.69, 9.73, 9.74, 303/9.75, 9.72, 9.66, 9.62, 22.1, 22.8, 22.7, 22.5; 188/349, 195; 251/336; 137/505.18

[56] References Cited

U.S. PATENT DOCUMENTS

| | | | |
|---|---|---|---|
| 3,669,504 | 6/1972 | Stokes | 303/9.72 |
| 3,721,473 | 3/1973 | Budzich | 303/9.72 |
| 3,738,708 | 6/1973 | Kawaguchi et al. | 303/9.72 |
| 4,062,597 | 12/1977 | Sawyer et al. | 303/9.69 |
| 4,113,317 | 9/1978 | Farr | 303/9.69 X |
| 4,615,566 | 10/1986 | Perrin | 303/9.69 |
| 4,750,791 | 6/1988 | Schonlau et al. | 188/195 |
| 5,082,332 | 1/1992 | Tribuzio et al. | 303/9.73 |
| 5,302,006 | 4/1994 | Castel | 303/9.69 |

FOREIGN PATENT DOCUMENTS

| | | |
|---|---|---|
| 088858 | 9/1983 | European Pat. Off. . |
| 0404617 | 12/1990 | European Pat. Off. . |
| 3636443 | 5/1988 | Germany . |
| 2060102 | 4/1981 | United Kingdom . |

*Primary Examiner*—Douglas C. Butler
*Attorney, Agent, or Firm*—Larry J. Palguta; Leo H. McCormick, Jr.

[57] ABSTRACT

The compensator comprises, in known manner, a body (1) in which are defined two pressure chambers (2, 3), a piston (4) carrying a valve (6) capable of bringing the chambers into communication with one another, a bearing mechanism (8, 81) and a reaction mechanism. The reaction mechanism comprises a second piston (5) sliding inside the first, a deformable member (8), and a locking mechanism (10, 11), in such a manner that the output pressure (P1) as a function of the input pressure (Po) has more than two slopes.

8 Claims, 3 Drawing Sheets

MULTISLOPE COMPENSATOR

This is a continuation of application Ser. No. 08/050,242 filed as PCT/FR93/00292, Mar. 24, 1993, now abandoned.

The present invention relates to a device which may be used in particular in a hydraulic circuit for the purpose of varying an output pressure as a function of an input pressure, and which comprises:

an elongated body in which is formed a bore divided into at least two pressure chambers filled with fluid, the first of which is subjected to the input pressure and the second to the output pressure, a first piston sliding in the bore and serving to delimit the first and second chambers, said piston having first and second pressure sections respectively exposed to the pressures of the first and second chambers, a valve carried by the first piston and cooperating with an element fastened to the elongated body so as to be opened or closed by this element as a function of the position of the first piston in the bore, this valve being continuously open at any value of the input pressure lower than a limit value, in order to permit equilibrium of the fluid pressures in the first and second chambers by free volume displacement between these chambers, bearing means exerting on the first piston an elastic force on which said limit value of the pressure depends and which urges this piston toward a continuously open position in which the valve is continuously open, and reaction means for exerting on the first piston a force increasing with the input pressure against the action of the elastic force and in a direction tending to move this piston away from its continuously open position and to offer at least partial resistance to any volume displacement from the first chamber toward the second at input pressure values higher than the limit value, these reaction means themselves comprising: a second piston sliding sealingly relative to the first and having a pressure section exposed at least to the pressure of the first chamber; a deformable member bearing at least against the second piston to receive a force which deforms this member as a function of at least the input pressure and to permit through its deformation a relative displacement of the two pistons toward a relative end position through the action of an increase in the input pressure; and locking means able to prevent any additional relative displacement of the pistons when they have reached their relative end position.

Devices of this type are known under the name of compensators and have been used for many years in hydraulic brake circuits for motor vehicles.

More precisely, compensators are interposed in hydraulic circuits upstream of rear wheel brake actuators in such a manner as to transmit to the latter, under heavy braking pressure, only a part of the pressure feeding the front wheel actuators and thus to prevent the inopportune locking of the rear wheels.

Compensators traditionally make it possible to vary the output pressure not only as a function of the input pressure, but also as a function of the load applied by the bearing means to the first piston, this load in turn depending on the load supported by the rear wheels of the vehicle.

On the other hand, for a given load, conventional compensators permit the evolution of the output pressure only in accordance with two affine functions of the input pressure, that is to say in accordance with a law represented by two segments of straight lines.

Although compensators also exist which allow evolution of the output pressure in accordance with three different regimes, at the present time these compensators have a structural complexity which makes their manufacture rather problematic and relatively expensive.

One example of such a compensator, according to the characteristics set out in the preamble, is given by the document GB-A-2,060,102.

In the compensator disclosed in this document, the number of joints and elementary components which are to be machined and assembled precisely is very considerable, which leads to rather problematic and expensive manufacture.

In this context, the object of the present invention is to provide a compensator permitting evolution of the output pressure in accordance with a law with more than two slopes, while its construction is nevertheless relatively simple.

To this end the device of the invention is essentially characterized in that the first piston is at least partially annular and in that the second piston slides inside this annular part of the first piston.

By virtue of these features, it has indeed appeared possible to produce a multislope compensator in which the body is pierced with only one bore and in which only one piston is hollow, which limits the machining problems and reduces the number of components required.

In a first possible embodiment of the invention (FIG. 1) the bearing means comprise a reaction disk which constitutes the deformable member.

In this case, it is desirable that the second piston should be in contact with the deformable member by means of a surface, the ratio of which to the pressure section of this piston is greater than the ratio of the first and second pressure sections of the first piston.

Moreover, the locking means then comprise for example a transverse pin fastened to the second piston, and a stop surface of a radial aperture which is formed in the first piston and through which the pin passes.

Preferably the valve comprises essentially a ball housed in the first piston and pushed by a spring against the inner edge of an orifice passing through this piston, and the element cooperating with this valve is a finger fastened to the body and capable of passing through the orifice in order to push back the ball.

In a second possible embodiment of the invention (FIG. 2) the valve comprises for example an annular edge formed by an outer radial extension of the first piston, and the element cooperating with this valve is a seal forming a seat for this annular edge.

In this case provision may advantageously be made for the second piston to present the same pressure section to the first and second chambers, and for the locking means to comprise at least one axial face of the second piston, this face being turned toward the outside of the first piston.

In this second embodiment of the invention the deformable member is for example a spring which pushes back the second piston in a direction tending to oppose the relative displacement of this second piston in relation to the first in the direction of the relative end position of these pistons.

Other features and advantages of the invention will clearly emerge from the description given below by way of indication and without limitation, with reference to the accompanying drawings, in which.

Figure 1:
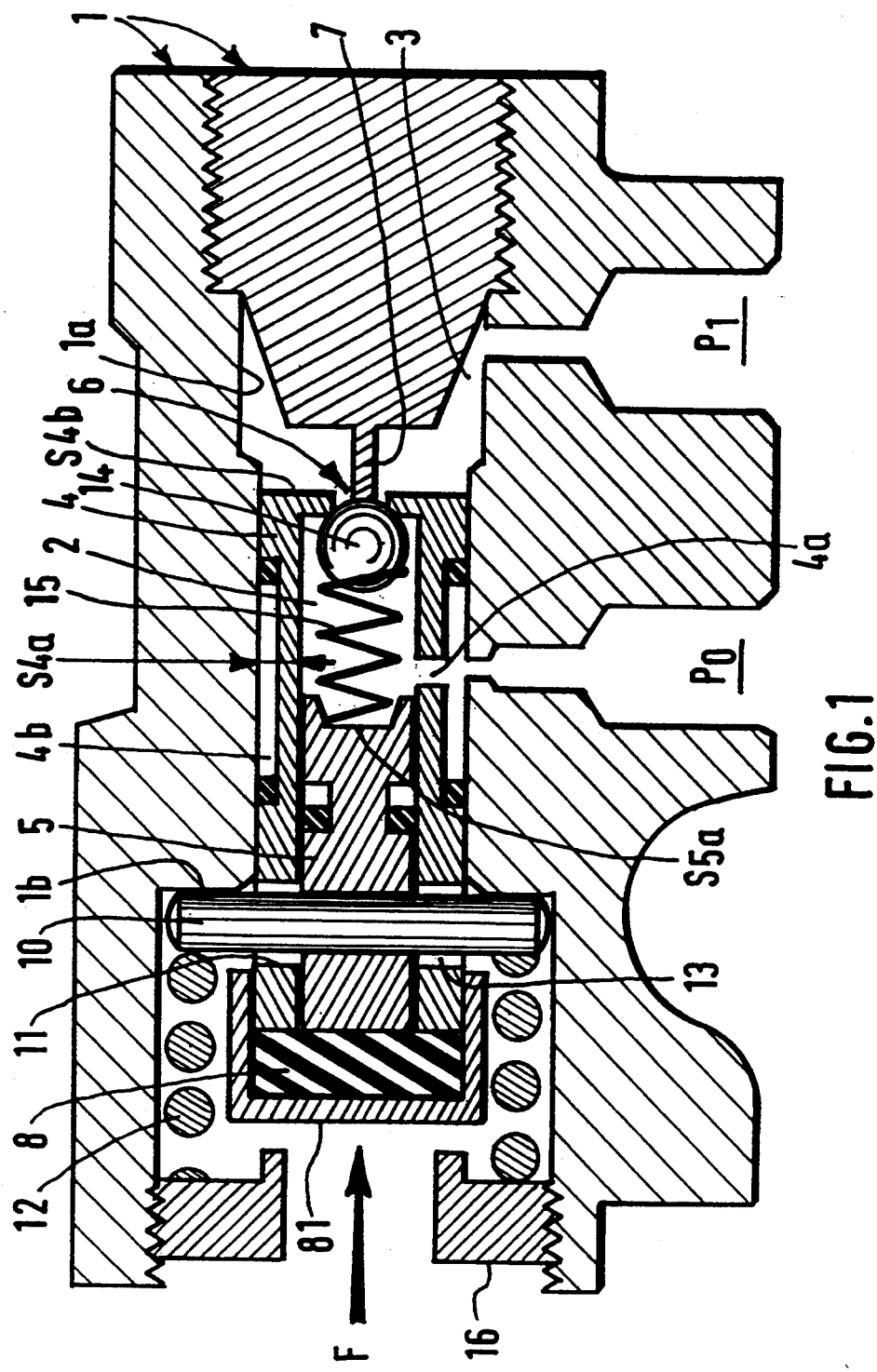
FIG. 1 is a schematic view in section of a device according to a first embodiment of the invention.
Figure 2:
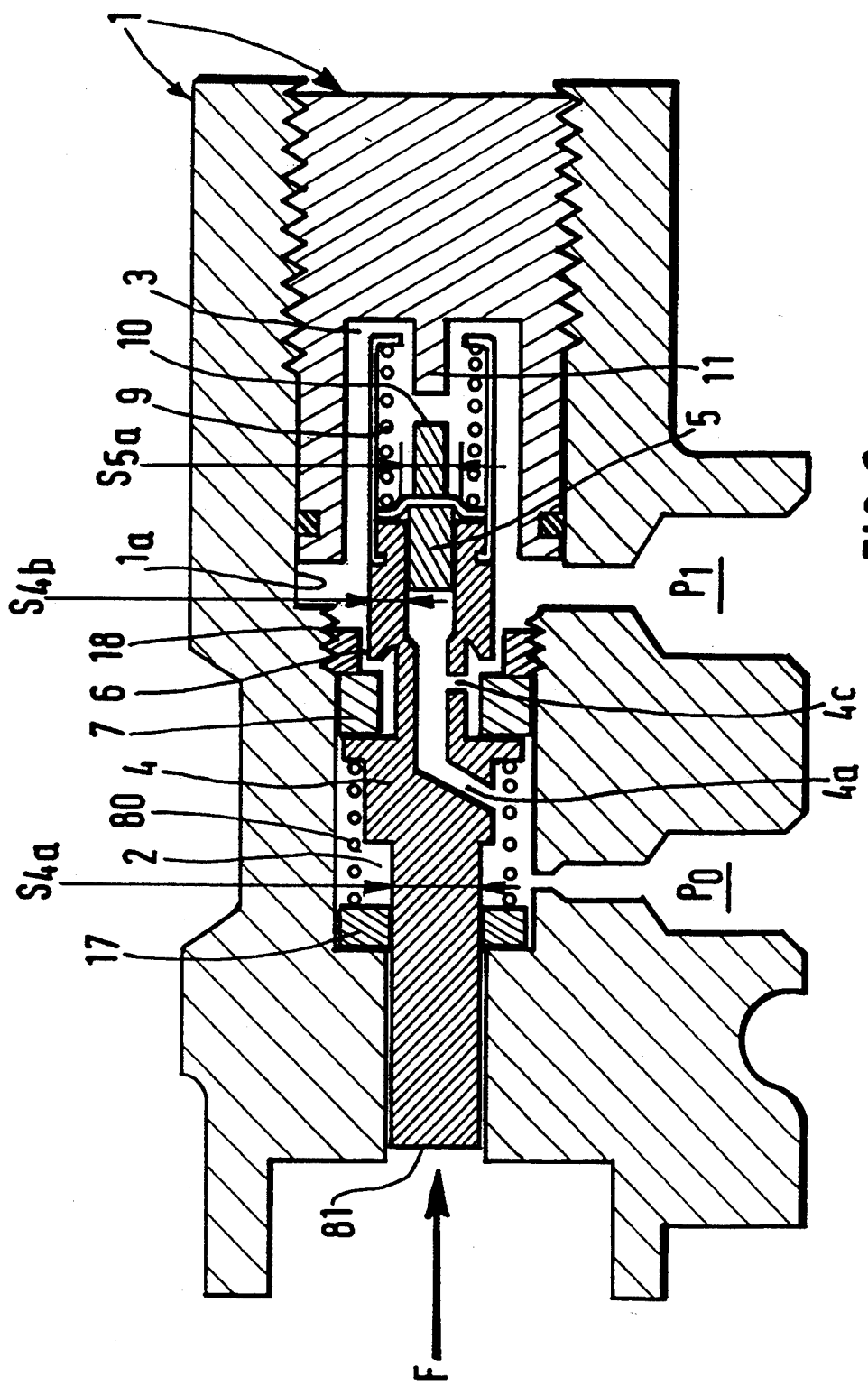
FIG. 2 is a schematic view in section of a device according to a second embodiment of the invention.

For reasons of clarity and simplicity elements serving the same functions are given the same reference numerals in FIGS. 1 and 2.

The device of the invention is intended to make it possible to vary an output pressure P1 as a function of an input pressure Po and a set force F.

This device comprises an elongated body 1 in which is formed a bore 1a, which may or may not be shouldered and which is divided into two chambers 2 and 3 filled with fluid, the first chamber 2 being subjected to the input pressure Po and the second chamber 3 being subjected to the output pressure P1.

A first piston 4, at least partially annular, is mounted slidably in the bore 1a and a second piston 5 is mounted slidably inside the annular part of the first piston 4.

The first piston 4 comprises first and second pressure sections S4a and S4b in the respective chambers 2 and 3, and the second piston 5 comprises a pressure section S5a exposed to at least the pressure of the first chamber 2.

The first piston 4 carries a valve 6 cooperating with an element 7 which is fastened to the body 1 and determines the opening or closing of said valve as a function of the position of the first piston 4 in the bore 1a.

As shown in FIG. 1, this valve may consist of a ball 14 housed inside the piston 4 and pushed by a spring 15 against the inner edge of an orifice passing through this piston, the element cooperating with this valve then being composed of a finger 7 fastened to the body 1 and able to pass through the orifice to push back the ball 14 out of its seat.

As shown in FIG. 2, the valve 6 may also be composed of an annular edge formed by an outer radial extension of the first piston 4, the element cooperating with this valve then being a seal forming a seat for this annular edge.

Whatever the embodiment, the valve 6 is continuously open at low values of the input pressure Po and up to a limit value Po, 1 of the latter.

The fluid present in the first chamber 2 is therefore initially freely in communication with the fluid present in the second chamber 3 and any increase in the input pressure Po is accompanied by an identical increase in the output pressure P1 through free volume displacement of fluid from the first chamber 2 toward the second chamber 3.

The first piston 4 is urged toward the right in FIGS. 1 and 2, in the direction of a continuously open position, in which the valve is continuously open, by an elastic force transmitted to this first piston by bearing means 8, 80, 81, details of which will be given below.

However, the first piston 4 is also urged in the opposite direction by reaction means which tend to move this piston away from its continuously open position and offer at least partial resistance to any volume displacement from the first chamber toward the second chamber as soon as the input pressure Po is higher than its limit value Po,1.

These reaction means, which comprise the second piston 5, a deformable member 8 or 9, and locking means 10, 11, will be described in detail with reference to each embodiment illustrated.

In the first embodiment of the invention, illustrated in FIG. 1, the second piston 5 is cylindrical and solid and slides sealingly inside the first piston 4, the latter being cylindrical and hollow and sliding sealingly in an unshouldered part of the bore 1a.

The first chamber 2 is formed inside the first piston 4 and by way of an orifice 4a and an annular space 4b in this piston is in communication with a source of fluid at the input pressure Po.

A pin 10 passes through the second piston 5 and is pressed against an inner shoulder 1b on the body 1 by a spring 12 stressed by a ring 16 screwed onto the body 1.

The pin 10 passes through a radial aperture 13 formed in the first piston 4 in such a manner as to allow a certain relative displacement of the pistons 4 and 5, this displacement being limited by the ability of the pin 10 to come into contact with the stop surface 11 forming the periphery of the aperture 13.

The axial face of the second piston 5, situated outside the first chamber 2, bears against a reaction disk 8 gripped in a rigid cup 81, with the remainder of its surface bearing against the axial annular face of the first piston 4 remote from the second chamber 3.

The reaction disk 8 which, through the cup 81, receives a set force F, the intensity of which varies the limit value Po,1, may for example be made of an elastomer material, behaves like a deformable, incompressible member, and, together with the spring 12, serves as bearing means.

Figure 3:
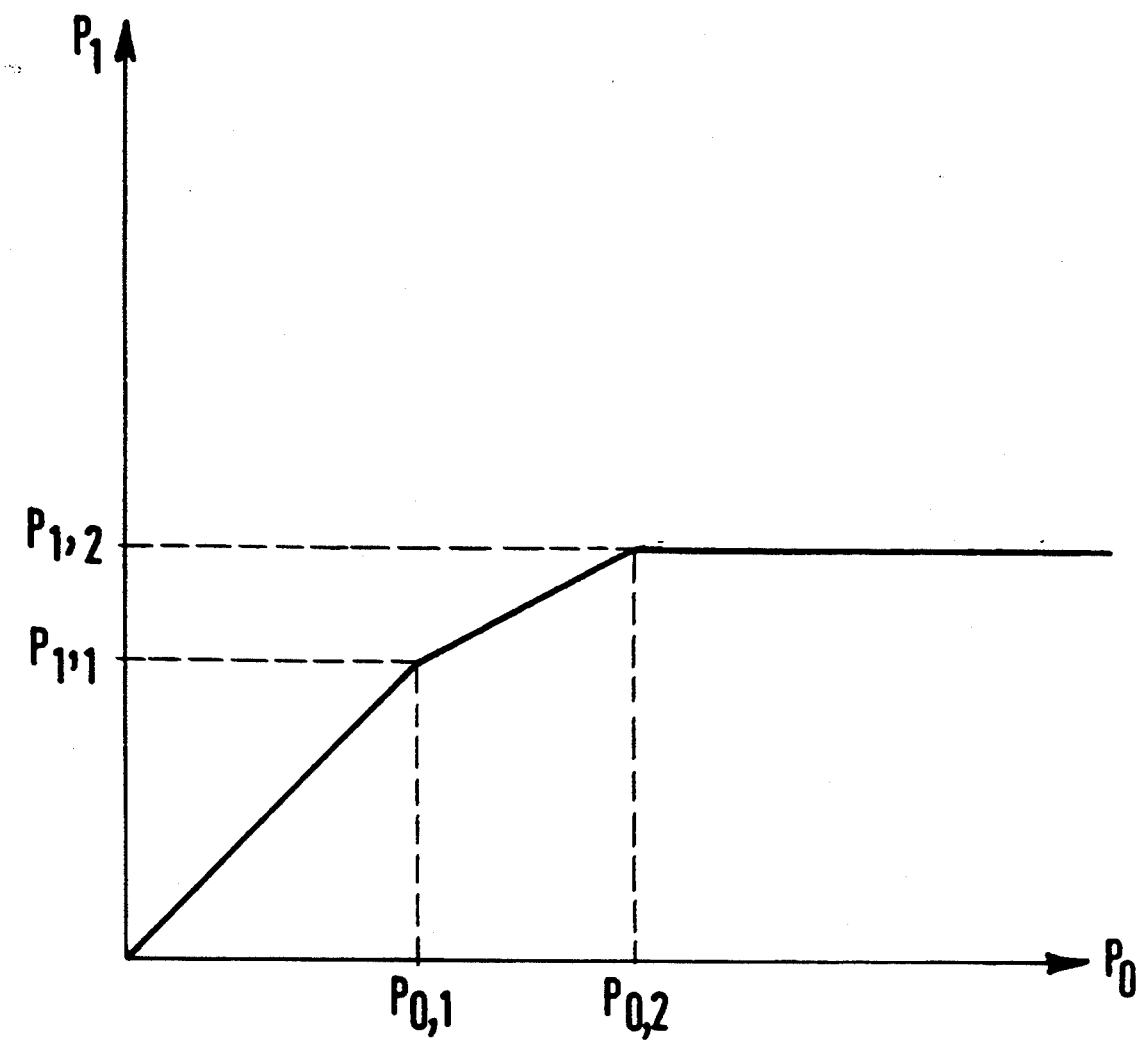
FIG. 3 is a diagram showing the evolution of the output pressure (P1) as a function of the input pressure (Po) in a device according to the invention.

The operation of the device illustrated in FIG. 1 can be understood on examination of FIGS. 1 and 3 and the following explanations.

With a minimum force F and at initially zero values of the effective input pressure Po and effective output pressure P1, the valve 6 is continuously open so that any increase of Po is accompanied by an identical increase of P1, and P1 is equal to Po.

The equality of P1 and Po is thus maintained over an entire range of low values of Po and P1.

Nevertheless, the rise of pressure in the chambers 2 and 3 is accompanied by an increasing force exerted toward the left on the first piston, which is subjected to this pressure on its section S4a, and on the second piston, which is subjected to this pressure on its section S5a.

This force, exerted counter to that exerted by the bearing means 8, 12, 81, pushes back the first piston 4 to the left and, at the limit value Po,1 of the input pressure, terminates the continuous opening of the valve 6.

Subsequent equilibrium is then governed by the equilibrium of the forces exerted on one another by the first and second pistons through the medium of the reaction disk 8.

As the second piston 5 bears against the disk over an area equal to its pressure section S5a, it appears that $Po.S5a = p.S5a$, where p is the pressure in the reaction disk 8.

Since in addition, if the section of the valve 6 is disregarded, $P1.S4b = p.S4a$, this means that $P1 = P0.S4a/S4b$.

Since finally S4a is lower than S4b, the slope of the law P1=f (Po) is lower than 1 beyond the limit value Po,1, as is shown in FIG. 3.

This situation continues until the pressure Po reaches a second limit value Po,2 at which the stop surface 11 comes to bear against the pin 10.

Since the relative movement of the pistons 4 and 5 is blocked, said pistons then behave as if they were composed of a single piece which, in the embodiment shown in FIG. 1, has no surface subjected to the input pressure Po, and any subsequent rise of the pressure P1 becomes impossible.

In the second embodiment of the invention, shown in FIG. 2, the piston 5 is also cylindrical and solid and slides sealingly inside an annular part of the first piston 4.

The first piston 4 in turn slides sealingly, by virtue of a seal 17, in the bore 1a and receives the set force F on its outer axial face 81.

This piston 4 is in addition urged toward the right by a spring 80 bearing against the body 1 and exerting on this piston a force in the same direction as the set force F.

The first piston 4 is able to move, as a function of the forces to which it is subjected, on either side of a seal 7 retained by a ring 18.

In its position of rest, corresponding to the low values of Po, the first piston permits free volume displacement of fluid from the first chamber 2 to the second chamber 3 by way of orifices such as 4a and 4c formed in this piston 4.

The second piston 5 is pushed back inside the piston 4 by a spring 9 bearing against the first piston 4.

The operation of the device according to this third embodiment is as follows.

The valve 6 is initially open and the output pressure P1 follows the input pressure Po until the latter reaches its first limit value Po,1.

Throughout this time, the input pressure Po exerts on the first section S4a of the first piston 4 a force which pushes it back outward, compressing the spring 80.

At the point where the input pressure Po reaches its first limit value Po,1, the valve 6 closes completely and any volume displacement from the first chamber to the second can thereafter be made only by displacement of the second piston 5.

Since however such a displacement encounters the resistance of the spring 9, the output pressure P1 evolves less quickly, beyond the point P1,1, than the input pressure Po.

When the input pressure Po reaches a second limit value Po,2, the axial face 10 of the piston 5 comes into contact with the fixed snug 11; any further movement of this second piston toward the right is then prohibited and the output pressure is maintained at its final value P1,2.

As shown in the examples illustrated in FIGS. 1 and 2, the general concept of the invention, which makes it possible to produce a compensator having more than two slopes while using a body in which only a single bore is formed and only one hollow piston, can be implemented in various ways.

Nevertheless, the first embodiment is somewhat superior, owing both to its simplicity and to the fact that the slope of magnitude $(P1,2-P1,1)/(Po,2-Po,1)$ is here determined exclusively by a ratio of sections.

Moreover, by forming a shoulder in the bore 1a of the device of the first embodiment, so that the first piston 4 has different annular sections on each side of the annular space 4b, it is possible to obtain, with a device thus modified, behaviour in respect of pressure which would, in FIG. 3, be shown by a third segment of non-zero slope beyond the point Po,2.

We claim:

1. Device for varying an output pressure as a function of at least an input pressure, comprising:
   an elongated body in which is formed a bore divided into at least first and second pressure chambers filled with fluid, the first of which is subjected to the input pressure and the second to the output pressure;
   a first piston sliding in the bore and serving to delimit the first and second chambers, said piston having first and second pressure sections respectively exposed to the pressures of the first and second chambers;
   a valve carried by the first piston and cooperating with an element connected with the elongated body so as to be opened and closed by the element as a function of the position of the first piston in the bore, the valve being continuously open at any value of the input pressure lower than a limit value in order to permit equilibrium of fluid pressures in the first and second chambers by free volume displacement between these chambers;
   bearing means exerting on the first piston an input force on which said limit value depends and which urges the first piston toward a continuously open position in which the valve is continuously open; and
   reaction means for exerting on the first piston a force increasing with the input pressure against the action of the elastic force and in a direction tending to move the first piston away from the continuously open position and to offer at least partial resistance to any volume displacement from the first chamber toward the second at input pressure values higher than the limit value, the reaction means comprising a second piston sliding sealingly relative to the first piston and having a pressure section exposed at least to the pressure of the first chamber, a deformable member bearing at least against the second piston to receive a force which deforms the deformable member as a function of at least the input pressure and to permit through deformation a relative displacement of the two pistons toward a relative end position through the action of an increase in the input pressure, and locking means able to prevent any additional relative displacement of the pistons when the pistons have reached the relative end position, characterized in that the first piston is at least partially annular and in that the second piston slides inside an annular part of the first piston.

2. Device according to claim 1, characterized in that the bearing means comprises a reaction disk which constitutes the deformable member.

3. Device according to claim 2, characterized in that the second piston is in contact with the deformable member by means of a surface, the ratio of which to the pressure section of the second piston is greater than the ratio of first and second pressure sections of the first piston.

4. Device according to any of claims 1 to 3, characterized in that the locking means comprises a transverse pin fastened to the second piston, and a stop surface of a radial aperture which is formed in the first piston and through which the pin passes.

5. Device according to any of claims 1 to 3, characterized in that the valve comprises essentially a ball housed in the first piston and pushed by a spring against an inner edge of an orifice passing through the first piston, and in that said element cooperating with the valve is a finger of the body and capable of passing through the orifice in order to push back the ball.

6. Device according to claim 1, characterized in that the valve comprises an annular edge formed by an outer radial extension of the first piston, and in that the element cooperating with the first valve is a seal forming a seat for the annular edge.

7. Device according to claim 6, characterized in that the second piston presents the same pressure section to the first and second chambers, and in that the locking means comprises at least one axial face of The second piston, the face being turned toward the outside of the first piston.

8. Device according to claim 1, characterized in that the deformable member is a spring which pushes back the second piston in a direction tending to oppose the relative displacement of the second piston in relation to the first piston in the direction of the relative end position of the pistons.

* * * * *